US012404913B1

(12) United States Patent
Sharifimehr et al.

(10) Patent No.: US 12,404,913 B1
(45) Date of Patent: Sep. 2, 2025

(54) DUAL PINION AND RING ARCHITECTURE FOR GEAR SYSTEMS

(71) Applicant: GM GLOBAL TECHNOLOGY OPERATIONS LLC, Detroit, MI (US)

(72) Inventors: Shahriar Sharifimehr, Auburn Hills, MI (US); Timothy J. Reinhart, Lake Orion, MI (US); Hai Xu, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/009,355

(22) Filed: Jan. 3, 2025

(51) Int. Cl.
*F16H 1/32* (2006.01)
*F16H 57/021* (2012.01)
*F16H 57/02* (2012.01)

(52) U.S. Cl.
CPC ............ *F16H 1/32* (2013.01); *F16H 57/021* (2013.01); *F16H 2001/324* (2013.01); *F16H 2001/327* (2013.01); *F16H 2001/328* (2013.01); *F16H 2057/02052* (2013.01)

(58) Field of Classification Search
CPC ......... F16H 2001/324; F16H 2001/328; F16H 1/32; F16H 37/082; B60K 17/043; B60K 17/046
See application file for complete search history.

(56) References Cited

U.S. PATENT DOCUMENTS

| 2,250,259 A | * | 7/1941 | Foote, Jr. | F16H 1/32 475/180 |
| 3,955,445 A | * | 5/1976 | Osterwalder | F16H 1/32 475/181 |
| 4,386,540 A | * | 6/1983 | Skaggs, Jr. | F16H 1/32 475/180 |
| 10,174,811 B2 | * | 1/2019 | Lee | B60K 7/0007 |

FOREIGN PATENT DOCUMENTS

| CN | 111677819 A | * | 9/2020 | ............ F16H 55/08 |
| DE | 102019105114 A1 | * | 9/2020 | ............ F16H 1/32 |
| EP | 2960546 A1 | * | 12/2015 | ............ F16H 1/32 |
| FR | 694654 A | * | 12/1930 | |
| FR | 1066672 A | * | 6/1954 | |

* cited by examiner

*Primary Examiner* — Sherry L Estremsky
(74) *Attorney, Agent, or Firm* — Ingrassia Fisher & Lorenz, LLP | IF&L (57) ABSTRACT

Gear systems include a dual pinion and ring architecture. A gear system includes a housing with a shaft extending in the housing. The shaft includes an eccentric section and is rotatable about an axis. The eccentric section has a center that circles around the axis when the shaft rotates. A pinion gear unit is mounted on the eccentric section and has two sets of gear teeth. A ring gear is fixed to the housing and engages with one set of the gear teeth. Another ring gear engages with the other set of gear teeth and is fixed to a rotatable member. The gear system operates so that rotation of the shaft at a first speed effects rotation of the rotatable member at a second speed through the shaft, the pinion gear unit, and the ring gears.

20 Claims, 5 Drawing Sheets

DUAL PINION AND RING ARCHITECTURE FOR GEAR SYSTEMS

INTRODUCTION

The technical field generally relates to gear systems, and more particularly relates to gear systems for transferring and multiplying torque from an input to an output through a compact and high-ratio capable dual pinion and ring architecture.

Gear systems are employed in a wide range of manufactured products such as equipment, machines, tools, vehicles and other apparatus. Various types of gears may be employed and those gears may have a wide variety of gear teeth arrangements. Many gear systems transfer power between an input and an output while providing the ability to select speed ratios and torque multiplication ratios. The individual gears and their linkages may be assembled in some applications, such as a transmission system, that include various torque transfer mechanisms, including those such as brakes and clutches, that may be selectively engaged and disengaged to control the torque path.

Considerations in the design of gear systems, in addition to the power, speed and torque that will be transmitted include weight, efficiency and complexity. Generally, systems that employ a greater number of individual gears require more manufacturing resources and result in greater weight. In addition, a higher number of gear meshes tends to decrease efficiency such as through spin losses. Other considerations include physical size, which impacts the ability to package the gears system in available space.

Accordingly, there is an ongoing desire for gear systems that deliver desirable power, torque and speed requirements while doing so in an efficient and low mass manner. There is also a desire to provide high-ratio torque transfer in a compact package. Furthermore, other desirable features and characteristics of the present disclosure will become apparent from the subsequent detailed description and the appended claims, taken in conjunction with the accompanying drawings and the foregoing introduction.

SUMMARY

Gear systems include a dual pinion and ring architecture. In a number of embodiments, a gear system includes a housing with a shaft extending in the housing. The shaft includes an eccentric section and is rotatable about an axis. The eccentric section has a center that circles around the axis when the shaft rotates. A pinion gear unit is mounted on the eccentric section and has two sets of gear teeth. A ring gear is fixed to the housing and engages with one set of the gear teeth. Another ring gear engages with the other set of gear teeth and is fixed to a rotatable member. The gear system operates so that rotation of the shaft at a first speed effects rotation of the rotatable member at a second speed through the shaft, the pinion gear unit, and the ring gears.

In additional embodiments, at least one counterweight extends from the shaft to balance the eccentric section.

In additional embodiments, a bearing assembly is disposed between the rotatable member and the housing. Axial loads on the additional ring gear are transferred to the housing through the rotatable member and the bearing assembly.

In additional embodiments, the pinion gear unit includes a stepped pinion gear.

In additional embodiments, a bearing assembly is disposed between the eccentric section and the pinion gear unit so that the pinion gear unit is rotatable on the eccentric section.

In additional embodiments, a counterweight extends from the shaft to balance the eccentric section. The output member covers a radial outside of the counterweight.

In additional embodiments, the shaft includes a pair of bearing sections that are rotatably supported on the housing. The bearing sections and the ring gears are disposed about the axis coaxially and the eccentric section is disposed offset from the axis.

In additional embodiments, one ring gear is larger in diameter than the other ring gear.

In additional embodiments, no more than two meshing gear pairs are included. One meshing gear pair includes the pinion gear unit and a ring gear and another meshing gear pair includes the pinion gear unit and the other ring gear.

In additional embodiments, the pinion gear unit includes a stepped pinion gear with a first pinion gear and a second pinion gear. The first pinion gear and the second pinion gear are configured to rotate and to orbit about the axis together on the eccentric section.

In a umber of additional embodiments, a gear system includes a housing and a gear set in the housing. The gear set includes a shaft extending in the housing. The shaft includes a base shaft section and an eccentric section. The shaft is rotatable about an axis, where the base shaft section is centered on the axis, and where the eccentric section has a center that is offset from the axis. The center circles around the axis when the shaft rotates. A pinion gear unit is mounted on the eccentric section. The pinion gear unit has a first pinion gear with a first set of gear teeth and a second pinion gear with a second set of gear teeth. A first ring gear engages with the first set of gear teeth. The first ring gear is fixed to the housing. A second ring gear engages with the second set of gear teeth. A rotatable member is fixed to the second ring gear. Rotation of the shaft at one speed effects rotation of the rotatable member at another speed through the shaft, the pinion gear unit, the first ring gear and the second ring gear.

In additional embodiments, a pair of counterweights extend from the shaft to balance the eccentric section.

In additional embodiments, a first bearing assembly is disposed between the rotatable member and the housing and a second bearing assembly disposed between the rotatable member and the shaft. Radial loads on the shaft are transferred to the housing through the second bearing assembly, the rotatable member and the first bearing assembly.

In additional embodiments, the pinion gear unit includes a stepped pinion gear with the first pinion gear and the second pinion gear formed as a unit.

In additional embodiments, a needle-type bearing assembly is disposed between the eccentric section and the pinion gear unit so that the pinion gear unit is rotatable on the eccentric section.

In additional embodiments, a pair of counterweights extend from the shaft to balance the eccentric section. The output member includes a flange that covers a radial outside of one counterweight of the pair of counterweights, and the output member includes an output shaft.

In additional embodiments, the shaft includes a pair of bearing sections as part of the base shaft section so that the shaft is rotatably supported on the housing. The base shaft section, the first ring gear and the second ring gear are disposed about the axis coaxially and the eccentric section is disposed on a center that is offset from the axis.

In additional embodiments, the first ring gear is larger in diameter than the second ring gear and the first pinion gear is larger than the second pinion gear.

In additional embodiments, no more than two meshing gear pairs are included where one meshing gear pair includes the first pinion gear and the first ring gear and another meshing gear pair includes the second pinion gear and the second ring gear.

In a number of other embodiments, a gear system for a vehicle that has a prime mover and an axle includes a housing fixed to the vehicle and a gear set in the housing. The gear set includes a shaft that is coupled with the prime mover and that extends in the housing. The shaft includes a base shaft section and an eccentric section. The shaft is rotatable about an axis. The base shaft section is centered on the axis and the eccentric section has a center that is offset from the axis. The center circles around the axis when the shaft rotates. A pinion gear unit is mounted on the eccentric section. The pinion gear unit has a first pinion gear with a first set of gear teeth and a second pinion gear with a second set of gear teeth. A first ring gear engages with the first set of gear teeth. The first ring gear is fixed to the housing. A second ring gear engages with the second set of gear teeth. A rotatable member is coupled with the axle and fixed to the second ring gear. The gear system is configured so that rotation of the shaft by the prime mover at a first speed effects rotation of the rotatable member and the axle at a second speed through the shaft, the pinion gear unit, the first ring gear and the second ring gear. The first pinion gear and the second pinion gear are configured to rotate and to orbit about the axis together on the eccentric section.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
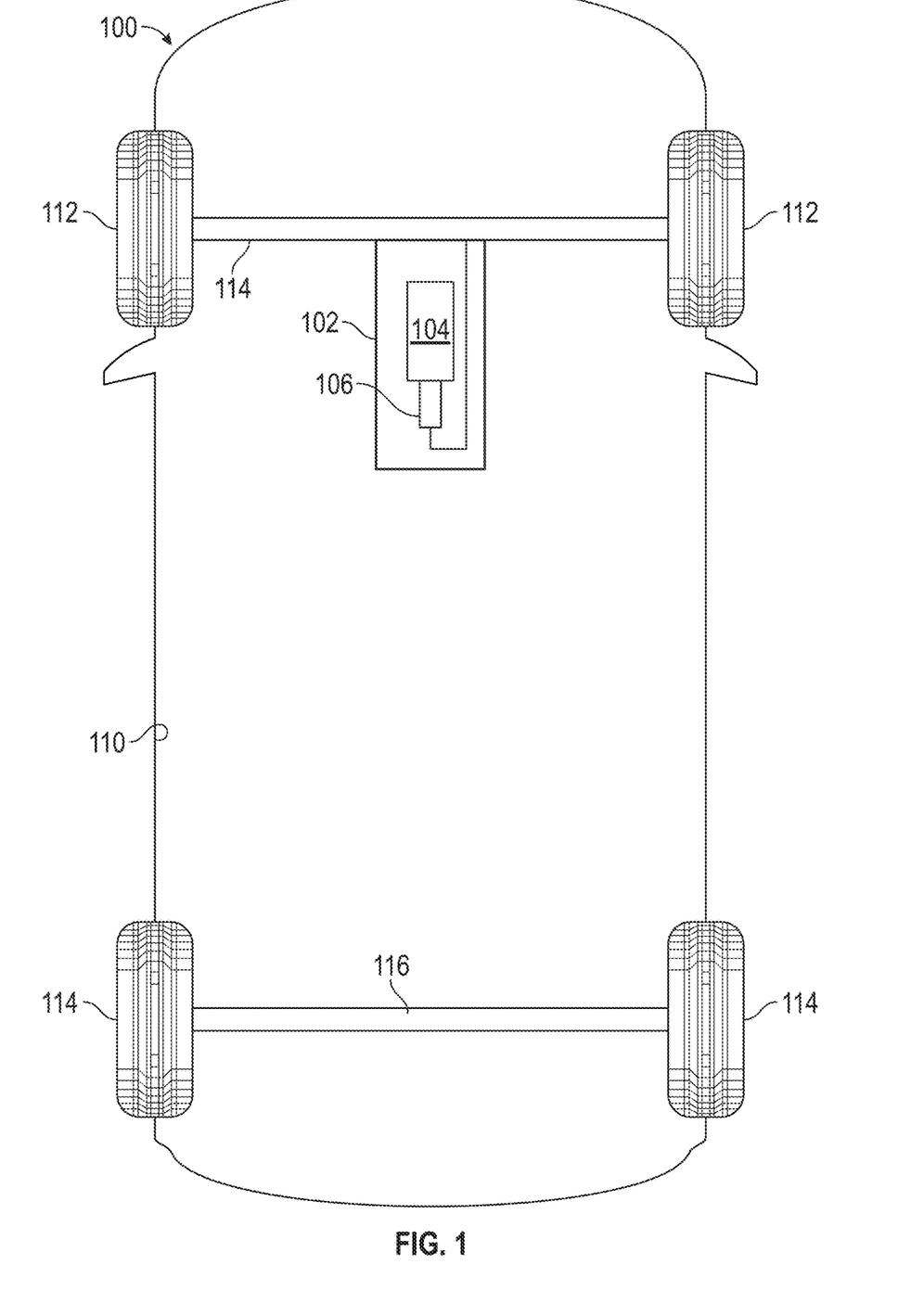
FIG. 1 is a functional block diagram of a vehicle including a dual pinion and ring architecture gear system, in accordance with various embodiments.

FIG. 1 illustrates a vehicle 100, according to an exemplary embodiment. As described in greater detail further below, the vehicle 100 includes powertrain 102 with a prime mover 104. A gear system 106 is installed in the powertrain 102 but may be used at any location in the vehicle 100 or in another application where power transfer is employed. For example, in other embodiments the gear system 106 may be included in any of various types of machinery and equipment.

In certain embodiments, the vehicle 100 includes a front axle 114 and a rear axle 116. In some embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise one or more other types of vehicles. In addition, in various embodiments, it will also be appreciated that the vehicle 100 may comprise any number of other types of mobile platforms.

In the depicted embodiment, the body 110 of the vehicle 100 substantially encloses other components of the vehicle 100. Also in the depicted embodiment, the vehicle 100 includes the above-referenced axles 114, 116 and front wheels 112, as well as rear wheels 115. The wheels 112, 115 are each rotationally coupled to a respective one or more of the axles 114, 116 near a respective corner of the body 110 to facilitate movement of the vehicle 100. In one embodiment, the vehicle 100 includes four wheels 112, 115 (namely, two front wheels 112 and two rear wheels 115), although this may vary in other embodiments (for example for trucks and certain other vehicles).

In various embodiments, powertrain 102 drives the wheels 112 and/or 115. The powertrain 102 preferably comprises a propulsion system. In certain exemplary embodiments, the powertrain comprises an internal combustion engine and/or an electric motor/generator as the prime mover 104. In certain embodiments, the powertrain 102 may vary, and/or two or more prime mover 104 types may be used. By way of example, the vehicle 100 may also incorporate any one of, or combination of, a number of different types of powertrains 102, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor. In the current embodiment, the prime mover 104 is an electric motor.

The gear system 106 includes a dual pinion and ring architecture as described in more detail below, and is coupled between the prime mover 104 and the axle 114. Through the axle 114, the prime mover 104 is coupled with the wheels 112 for propelling the vehicle 100. The coupling may be effected through a variety of arrangements such as to accommodate a transverse or longitudinally disposed prime mover 104 and may include a differential or other mechanism to connect with one or two half shafts. The architecture of the gear system 106 is adapted to applications such as in an electric motor, or other powertrain 102. The dual pinion and ring architecture allows for a high overall ratio between input and output while avoiding extremely high speeds of the involved gears.

Figure 2:
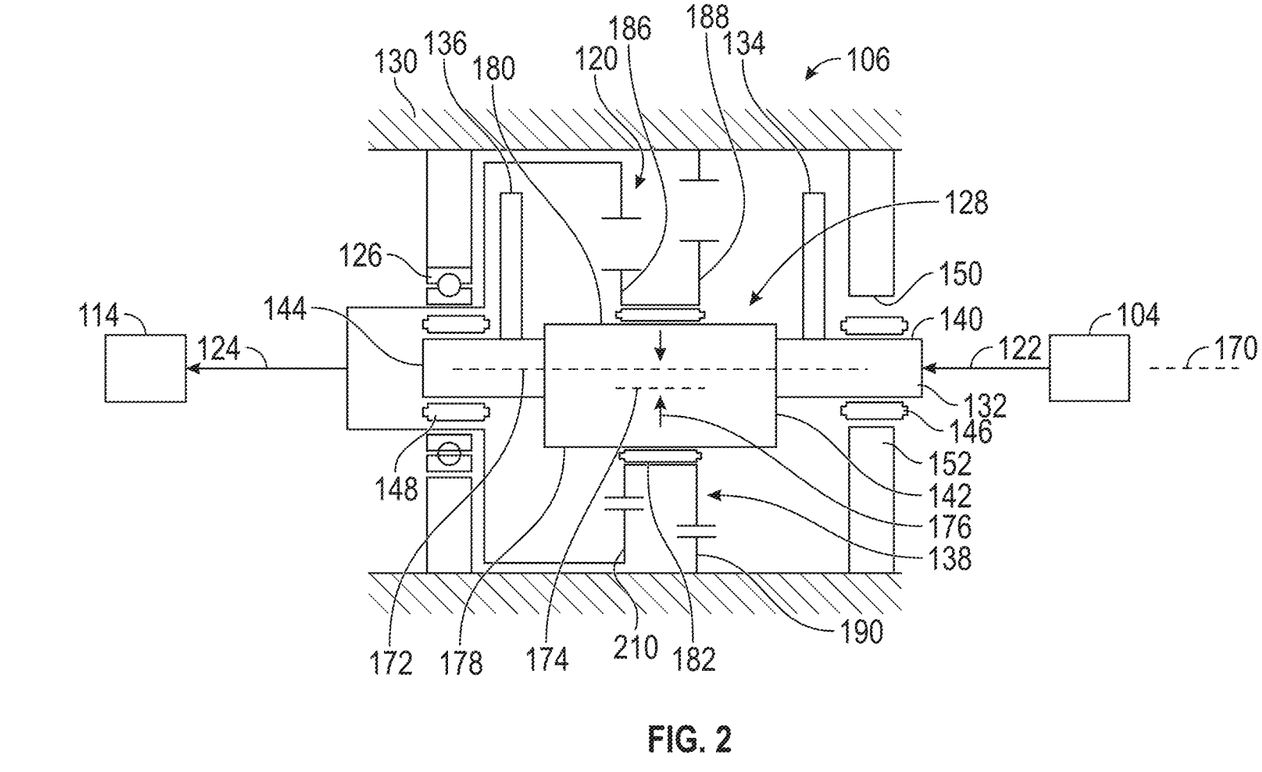
FIG. 2 is a schematic diagram of the dual pinion and ring architecture gear system of the vehicle of FIG. 1, in accordance with various embodiments.

Referring to FIG. 2, a gearset 120 of the gear system 106 is illustrated in schematic form. The gearset 120 receives an input 122, such as power from the prime mover 104. The gearset 120 delivers an output 124 such as to the axle 114. It will be appreciated that between the prime mover 104 and the gearset 120 and/or between the gearset 120 and the axle 114 a number of elements such as links, clutches, brakes, additional gears, and other torque transfer elements may be included to deliver the desired power to the wheels 112 and/or 115 in a desired way.

The gearset 120 may be contained in a housing 130 that may be a type of case, frame, mount, block, or other structure. In the current embodiment, the housing 130 is mounted in the vehicle 100 and provides a fixed ground type structure relative to the gearset 120. In embodiments, the housing 130 contains a fluid, such as oil for lubricating the gearset 120. The housing 130 provides a structure on, or within which, to mount the various nonrotating elements of the gearset 120 and to rotatably support the rotating elements.

Figure 3:
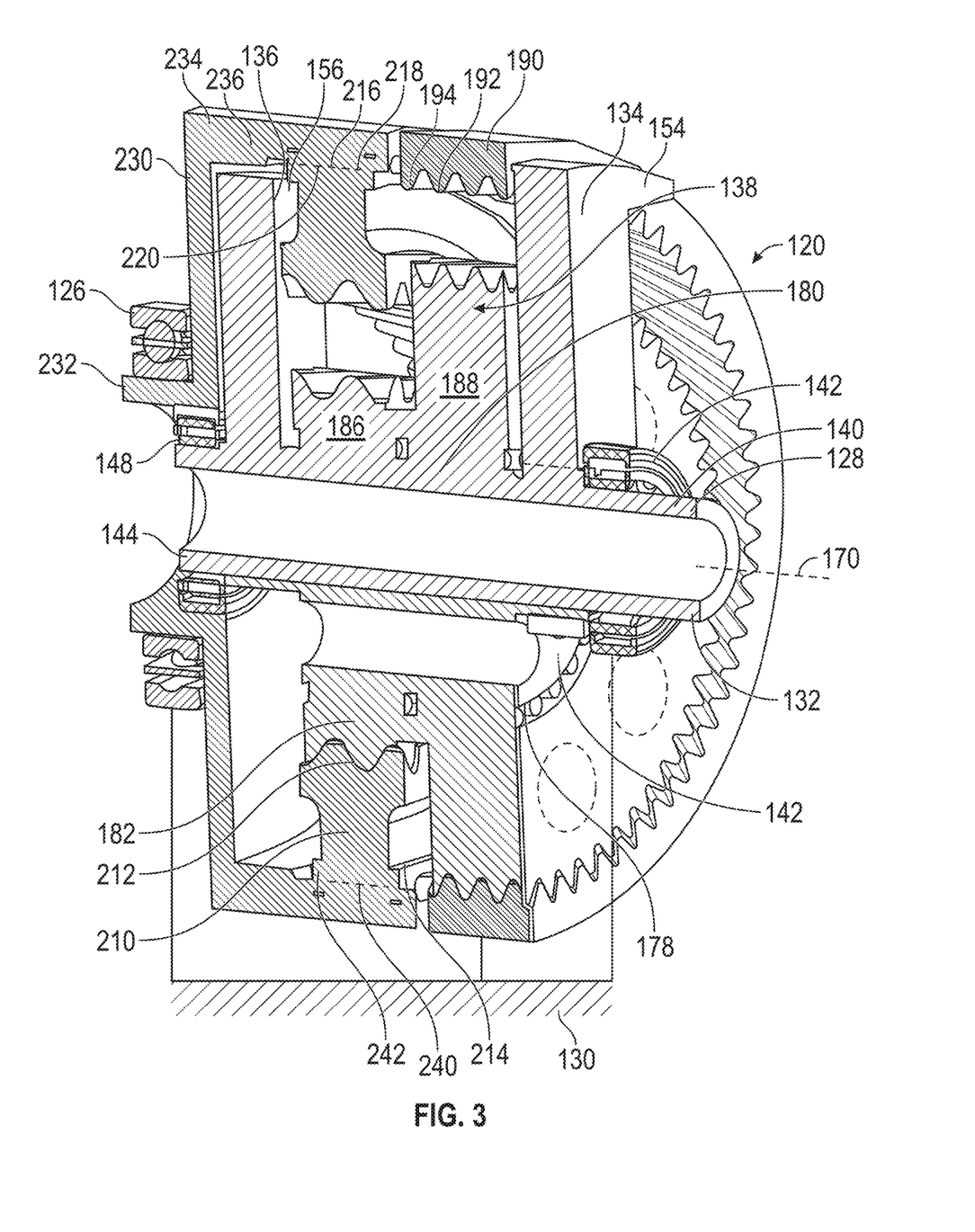
FIG. 3 is a sectional perspective view of aspects of the gearset exhibiting the dual pinion and ring architecture of FIG. 2 and shown removed from its application, in accordance with various embodiments.

Referring additionally to FIG. 3, the gearset 120 includes a rotating assembly 128 that, in general, includes a shaft 132, a pair of counterweights 134 and 136 and a pinion gear unit 138. The shaft 132 has a bearing section 140, an eccentric section 142 and a bearing section 144. The bearing section 140, the eccentric section 142 and the bearing section 144 may be formed of an integral body or the eccentric section 142 may be separately formed and fixed on a base shaft that includes the bearing sections 140 and 144. For example, the bearing sections 140 and 144 comprise a base shaft section centered on an axis 170 or may be part of a base shaft that extends through the eccentric section 142 on the axis 170. The bearing sections 140 and 144 are constrained in bearing assemblies 146 and 148, respectively. The bearing assemblies 146 and 148 constrain relative motion of the shaft 132 to only the desired rotating motion and to minimize friction during the rotation. The bearing assembly 146 is mounted in an opening 150 of a structural element 152 that may be a part of the housing 130 or that may be fixed to the housing 130. The bearing assembly 148 is indirectly mounted on the housing 130 through a bearing assembly 126. As a result, the shaft 132 is rotatable in the housing 130 as driven by the input 122.

Figure 4:
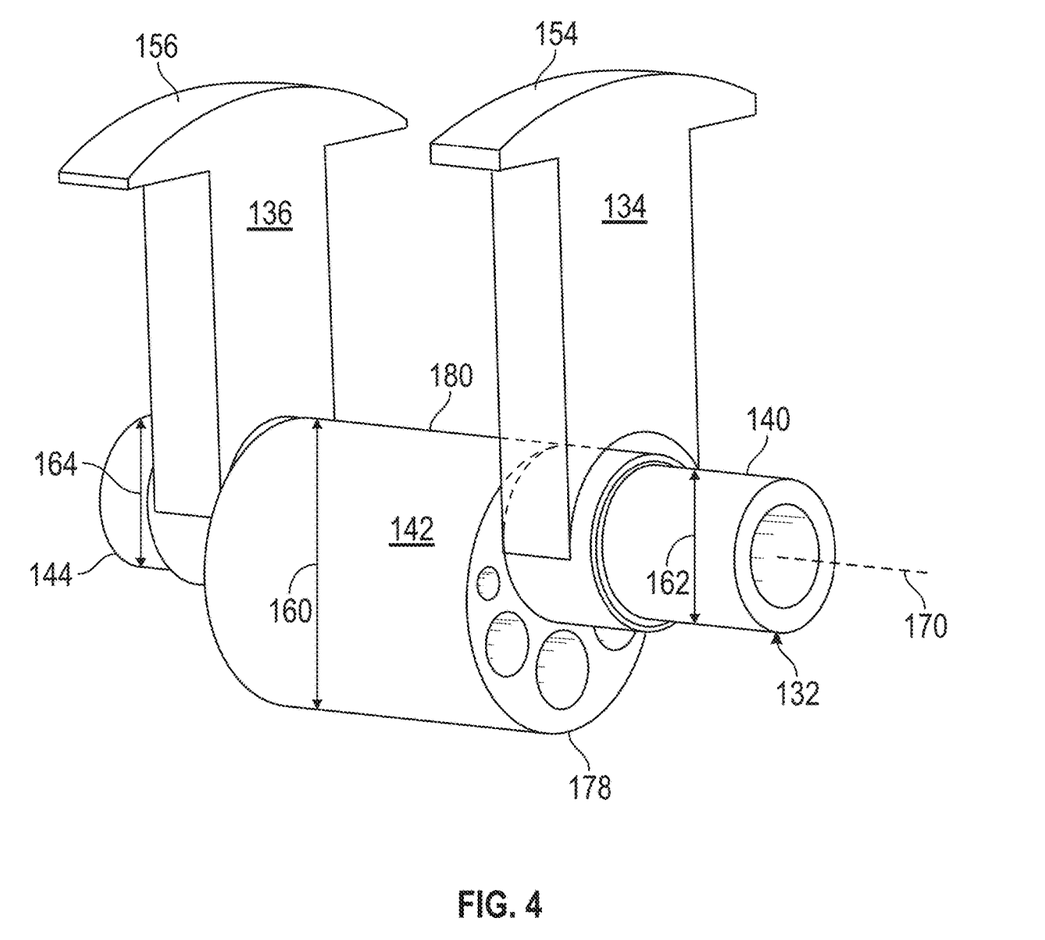
FIG. 4 is a perspective view of the shaft, eccentric and counterweights of the gearset of FIG. 3, shown in isolation, in accordance with various embodiments.

The shaft 132 rotates about the axis 170. Referring additionally to FIG. 4, the eccentric section 142 has a diameter 160 that is larger than the diameter 162 of the bearing section 140 and that is larger than the diameter 164 of the bearing section 144. The eccentric section 142 is a cylindrical section fixed to, or formed with, the bearing sections 140 and 144. As shown in FIG. 2, the bearing sections 140 and 144 have a common center 172 that coincides with the axis 170. The eccentric section 142 has a center 174 that is offset by an offset distance 176 from the center 172 (and the axis 170). As a result of the offset distance 176, the eccentric section 142 has a high side 178 and a low side 180. Accordingly, when the shaft 132 rotates, the high side 178 travels around the axis 170 providing a circular path for the center 174 around the axis 170. This also provides a circular path for the eccentric section 142 and anything disposed on it, such as the pinion gear unit 138. Because the eccentric section 142 has its center positioned off-center relative to the axis 170 of the shaft 132, as the shaft 132 rotates the center 174 of the eccentric section 142 follows the circular path around the axis 170 as it rotates.

The counterweights 134 and 136 extend from the shaft 132 on the same side of the shaft 132 as the low side 180. Because of the offset nature of the eccentric section 142, the weight of the high side 178 as compared to the lower weight of the low side 180, imparts an imbalance. That imbalance is negated by the counterweights 134 and 136. In other words, with the counterweights 134 and 136, the rotating assembly 128 of the shaft 132 and the counterweights 134 and 136 is balanced for rotation. The weight of the pinion gear unit 138 is also considered in the balancing. In embodiments, the eccentric section 142 may have openings to reduce its weight. The counterweights 134 and 136 each have a T-shape with a head 154 and 156, respectively, the shapes, weights and sizes of which may be tuned for balancing the eccentric section 142.

Figure 5:
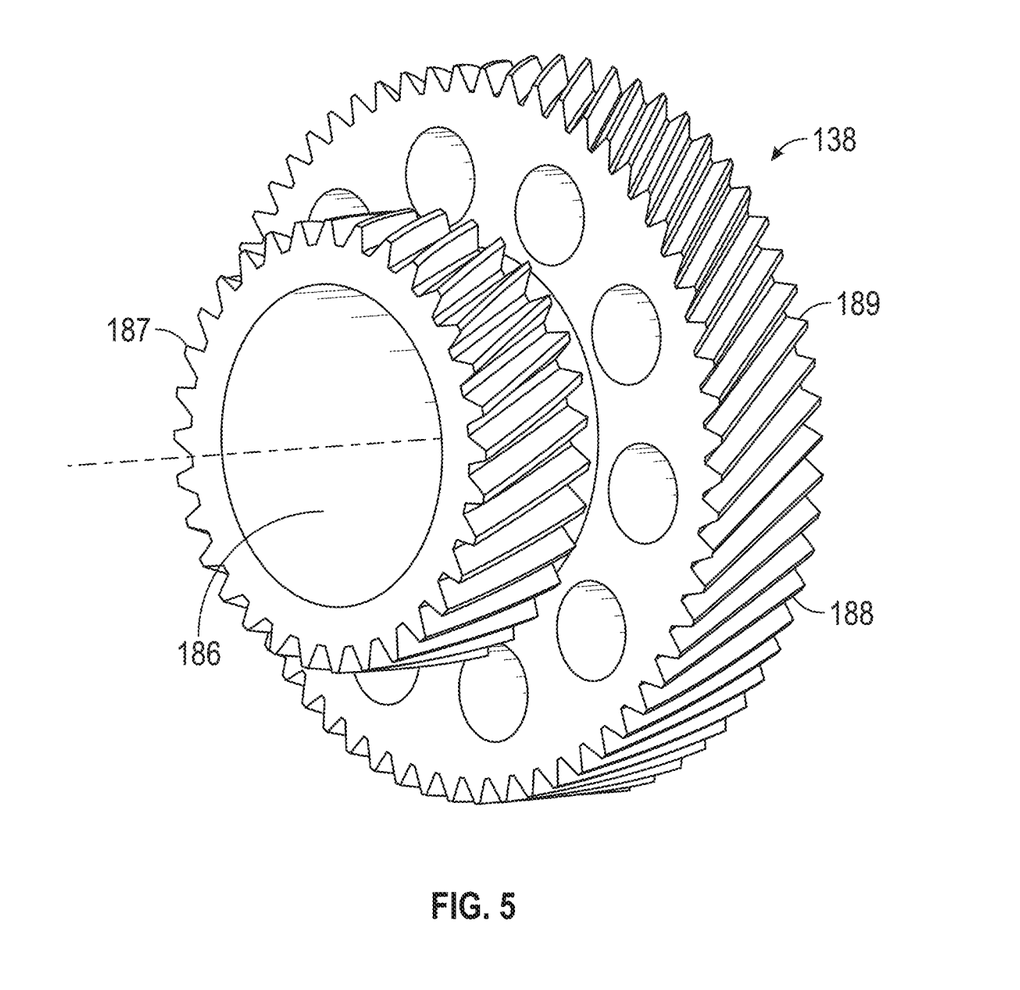
FIG. 5 is a perspective view of the pinion gear unit of the gearset of FIG. 3, shown in isolation, in accordance with various embodiments.

Referring additionally to FIG. 5, the pinion gear unit 138 is shown in isolation and in FIGS. 3 and 4 it can be seen that the pinion gear unit 138 is a part of the rotating assembly 128. The pinion gear unit 138 includes two pinion gears 186 and 188 with sets of gear teeth including teeth 187 and 189 on their respective outside circumferences. In this case, the pinion gears 186 and 188 are part of a stepped pinion type pinion gear unit 138. The pinion gear 186 is smaller than the pinion gear 188 and the two are formed together as one unit and mounted on the shaft 132 so that they rotate and orbit together. In other embodiments, the pinion gear 186 may be formed as a separate piece from the pinion gear 188 and the two may be mounted on the shaft 132 to rotate and orbit together. A bearing assembly 182, which may be a needle bearing or another type, is disposed between the eccentric section 142 and the pinion gear unit 138. In embodiments, two of the bearing assembly 182 may be used. The bearing assembly 182 allows the pinion gear unit 138 to rotate on the eccentric section 142.

As shown in FIGS. 2 and 3, a ring gear 190 is included in the gearset 120. The ring gear 190 is an internal ring gear with teeth 192 on the inside circumference 194 of the ring-shaped or annular structure. The ring gear 190 and specifically its teeth 192 are designed to mesh with the pinion gear 188. The ring gear 190 is mounted in the housing 130. As such, the ring gear 190 is fixed to not rotate relative to the housing 130 and may be referred to as a grounded ring gear.

Another ring gear 210 is included in the gearset 120. The ring gear 210 is an internal ring gear with teeth 212 on the inside circumference 214 of the ring-shaped or annular structure. The ring gear 210 and specifically its teeth 212 are designed to mesh with the pinion gear 186. The ring gear 210 has keyways 216 around its outer circumference 218 that engage with keys 220 of a rotatable member referred to as an output cover 230, or as a cover 230. The cover 230 is a shell-like member with a shaft 232 attached to a cup 234 that has a flange 236 that extends axially. The flange 236 extends around the radially outside of, and provides a type of cover for, the counterweight 136. The flange 236 includes the keys 220 within which the ring gear 210 is contained with its keyways 216 engaging with the keys 220 providing a splined type connection. As such, the ring gear 210 and the cover 230 are fixed to each other to rotate together. A pair of snap rings 240 and 242 engage in grooves in the cover 230 to hold the ring gear 210 in position when assembled.

When the shaft 132 is driven to rotate as an input shaft, the pinion gears 186 and 188 orbit around the axis 170 as driven by the eccentric section 142. As the shaft 132 rotates, the pinion gear 188 travels around the ring gear 190 in its orbit. Specifically, the pinion gear 188 travels around the inside circumference 194 of the ring gear 190, which causes the pinion gears 186 and 188 to spin on the eccentric section 142. The pinion gear 186 spins at the same rotational speed as the pinion gear 188. The pinion gear 186 engages with the ring gear 210. As a result, the pinion gear 186 causes the ring gear 210 to rotate. In-turn, the rotation of the ring gear 210 imparts rotation to the cover 230 and the shaft 232, which operates as an output shaft.

The connection between the ring gear 210 and the cover 230 is through the splined connection of the keyways 216 and the keys 220. Axial loads on the ring gear 210 are transferred to the cover 230. The axial loads are then transferred to the housing 130 through the bearing assembly 126, which may be a ball bearing assembly designed to incur axial loading or an axial roller bearing may be employed. Radial loads on the shaft 132 are transferred to the housing 130 through the bearing assembly 148, the cover 230 and the bearing assembly 126 and also through the bearing assembly 146.

The gearset 120 may be employed in applications where a high ratio and small size are desirable. The pinion gear unit 138 may be similar to a type of planetary pinion gear that orbits within the ring gears 190 and 210 as a result of the eccentric section 142 of the shaft 132. The eccentric section 142 may act as a type of planetary carrier for the gear system 106. High overall ratios may be achieved in a radially compact space. For example, ratios up to and even surpassing 20:1 may be provided. A feature is that higher ratios may be achieved with smaller radial sizing of the gearset 120. Another feature is that rotational speeds of the pinion gears are maintained at acceptable low levels. Also, since there are only two gear meshes in this gear system 106 there is lower power loss as compared to systems with more meshes. In addition, none of the gears in the gearset 120 require clocking for manufacturing and assembly.

Accordingly, a gear system is provided with only two external-internal gear meshes in the architecture. The two external-internal gear pairs may both be described as planetary-type systems. However, these planetary-type systems only have one gear unit that may be considered similar to a planet gear (external gear) and no sun gear. Two external pinion gears are carried on one shaft and form a stepped pinion type gear. The input shaft has an eccentric section, similar to a cam shaft, that acts as a type of planetary carrier. The rotating assembly containing the two external gears is assembled on the eccentric section of the input shaft with needle bearings between the two parts. One internal ring gear meshes with a relatively larger pinion and is grounded, and another internal ring gear meshes with a relatively smaller pinion to provide the output of the system. The output ring gear is connected to a cover that includes an output shaft. Depending on the power transfer strategy, this cover may either be connected to a driveline differential or directly splined to an axle half shaft. Counterweights balance the eccentric motion of the system. To assist with assembly, one counterweight may be forged with the input shaft while the other counterweight may be designed to be assembled on the input shaft using press-fit and/or a keyway to ensure correct alignment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A gear system comprising:
 a housing;
 a shaft extending in the housing, the shaft including an eccentric section, wherein the shaft is rotatable about an axis and wherein the eccentric section has a center that circles around the axis when the shaft rotates;
 a pinion gear unit mounted on the eccentric section, the pinion gear unit having a first set of gear teeth and a second set of gear teeth;
 a first ring gear engaging with the first set of gear teeth, the first ring gear fixed to the housing;
 a second ring gear engaging with the second set of gear teeth;
 a counterweight extending from the shaft to balance the eccentric section, wherein the counterweight has a head with a shape that is T-shaped and that is disposed axially in-line with the first ring gear with a radially outer portion of the head being axially adjacent the first ring gear, wherein the shape is configured to be tuned for balancing the eccentric section; and
 a rotatable member fixed to the second ring gear,
 wherein the gear system is configured so that rotation of the shaft at a first speed effects rotation of the rotatable member at a second speed through the shaft, the pinion gear unit, the first ring gear and the second ring gear.

2. The gear system of claim 1, wherein the T-shaped head has a pair of arms that taper.

3. The gear system of claim 1, wherein the rotatable member has a hollow shaft section extending axially along, around and adjacent the shaft, and comprising a first bearing assembly disposed between and contacting both the hollow shaft section of the rotatable member and the housing, and a second bearing assembly disposed between and contacting both the shaft and the hollow shaft section of the rotatable member, wherein axial loads on the second ring gear are transferred to the housing through the second bearing assembly, the rotatable member and the first bearing assembly.

4. The gear system of claim 1, wherein the eccentric section is configured with openings to reduce weight, wherein the openings extend completely through the eccentric section in a direction parallel to the axis.

5. The gear system of claim 1, comprising a needle bearing assembly disposed between the eccentric section and the pinion gear unit so that the pinion gear unit is rotatable on the eccentric section, wherein the needle bearing assembly contacts the eccentric section and the pinion gear unit.

6. The gear system of claim 1, wherein the eccentric section is configured with openings to reduce weight, wherein the openings extend completely through the eccentric section in a direction parallel to the axis, wherein the eccentric section has a high side and a low side, wherein the openings include a first opening that is centered on the high side and that is larger than others of the openings.

7. The gear system of claim 1, wherein the shaft includes a pair of bearing sections that are rotatably supported on the housing, wherein the bearing sections, the first ring gear and the second ring gear are disposed about the axis coaxially and wherein the eccentric section is disposed offset from the axis.

8. The gear system of claim 1, wherein:
 the housing is mounted in a vehicle;
 the rotatable member is coupled with a wheel of the vehicle through an axle of the vehicle,
 the shaft is coupled with a powertrain of the vehicle, and
 the powertrain drives the wheel through, in order, the shaft, the pinion gear unit, the second ring gear, the rotatable member, and the axle.

9. The gear system of claim 1, comprising no more than two meshing gear pairs, wherein a first meshing gear pair includes the pinion gear unit and the first ring gear and a second meshing gear pair includes the pinion gear unit and the second ring gear.

10. The gear system of claim 1, wherein the pinion gear unit comprises a stepped pinion gear with a first pinion gear and a second pinion gear, wherein the first pinion gear and the second pinion gear are configured to rotate and to orbit about the axis together on the eccentric section.

11. A gear system comprising:
a housing; and
a gear set in the housing, the gear set including:
a shaft extending in the housing, the shaft including a base shaft section and an eccentric section, wherein the shaft is rotatable about an axis, wherein the base shaft section is centered on the axis, and wherein the eccentric section has a center that is offset from the axis, wherein the center circles around the axis when the shaft rotates;
a pinion gear unit mounted on the eccentric section, the pinion gear unit having a first pinion gear with a first set of gear teeth and a second pinion gear with a second set of gear teeth;
a first ring gear engaging with the first set of gear teeth, the first ring gear fixed to the housing;
a second ring gear engaging with the second set of gear teeth;
a counterweight extending from the shaft to balance the eccentric section, wherein the counterweight has a head with a shape that is T-shaped and that is disposed axially in-line with the first ring gear with a radially outer portion of the head being axially adjacent the first ring gear, wherein the shape is configured to be tuned for balancing the eccentric section; and
a rotatable member fixed to the second ring gear,
wherein the gear system is configured so that rotation of the shaft at a first speed effects rotation of the rotatable member at a second speed through the shaft, the pinion gear unit, the first ring gear and the second ring gear.

12. The gear system of claim 11, wherein the T-shaped head has a pair of arms that taper.

13. The gear system of claim 11, wherein the rotatable member has a hollow shaft section extending axially along, around and adjacent the shaft, and comprising a first bearing assembly disposed between the rotatable member and the housing and contacting both the hollow shaft section and the housing, and a second bearing assembly disposed between and contacting both the hollow shaft section of the rotatable member and the shaft, wherein radial loads on the shaft are transferred to the housing through the second bearing assembly, the rotatable member and the first bearing assembly.

14. The gear system of claim 11, wherein the eccentric section is configured with openings to reduce weight, wherein the openings extend completely through the eccentric section in a direction parallel to the axis.

15. The gear system of claim 11, comprising a needle-type bearing assembly disposed between the eccentric section and the pinion gear unit so that the pinion gear unit is rotatable on the eccentric section.

16. The gear system of claim 11, wherein the eccentric section is configured with openings to reduce weight, wherein the openings extend completely through the eccentric section in a direction parallel to the axis, wherein the eccentric section has a high side and a low side, wherein the openings include a first opening that is centered on the high side and that is larger than others of the openings.

17. The gear system of claim 11, wherein the shaft includes a pair of bearing sections as part of the base shaft section so that the shaft is rotatably supported on the housing, wherein the base shaft section, the first ring gear and the second ring gear are disposed about the axis coaxially and wherein the eccentric section is disposed on a center that is offset from the axis.

18. The gear system of claim 11, wherein:
the housing is mounted in a vehicle;
the rotatable member is coupled with a wheel of the vehicle through an axle of the vehicle,
the shaft is coupled with a powertrain of the vehicle, and
the powertrain drives the wheel through, in order, the shaft, the pinion gear unit, the second ring gear, the rotatable member, and the axle.

19. The gear system of claim 11, comprising no more than two meshing gear pairs, wherein a first meshing gear pair includes the first pinion gear and the first ring gear and a second meshing gear pair includes the second pinion gear and the second ring gear.

20. A gear system for a vehicle having a prime mover and an axle, the gear system comprising:
a housing fixed to the vehicle; and
a gear set in the housing, the gear set including:
a shaft coupled with the prime mover and extending in the housing, the shaft including a base shaft section and an eccentric section, wherein the shaft is rotatable about an axis, wherein the base shaft section is centered on the axis, and wherein the eccentric section has a center that is offset from the axis, wherein the center circles around the axis when the shaft rotates;
a pinion gear unit mounted on the eccentric section, the pinion gear unit having a first pinion gear with a first set of gear teeth and a second pinion gear with a second set of gear teeth;
a first ring gear engaging with the first set of gear teeth, the first ring gear fixed to the housing;
a second ring gear engaging with the second set of gear teeth;
a counterweight extending from the shaft to balance the eccentric section, wherein the counterweight has a head with a shape that is T-shaped and that is disposed axially in-line with the first ring gear with a radially outer portion of the head being axially adjacent the first ring gear, wherein the shape is configured to be tuned for balancing the eccentric section; and
a rotatable member coupled with the axle and fixed to the second ring gear,
wherein the eccentric section is configured with openings to reduce weight, wherein the openings extend completely through the eccentric section in a direction parallel to the axis, wherein the eccentric section has a high side and a low side, wherein the openings include a first opening that is centered on the high side and that is larger than others of the openings,
wherein the gear system is configured so that rotation of the shaft by the prime mover at a first speed effects rotation of the rotatable member and the axle at a second speed through the shaft, the pinion gear unit, the first ring gear and the second ring gear,
wherein the first pinion gear and the second pinion gear are configured to rotate and to orbit about the axis together on the eccentric section.

* * * * *